United States Patent [19]

Hirane

[11] Patent Number: 5,750,041

[45] Date of Patent: May 12, 1998

[54] METHOD FOR BACKWASHING WATER PROCESSING SYSTEMS

[76] Inventor: Ken Hirane, 10-9 Shimomeguro 5 chome, Meguro-ku, Tokyo, Japan

[21] Appl. No.: 767,469

[22] Filed: Dec. 16, 1996

Related U.S. Application Data

[63] Continuation-in-part of Ser. No. 506,738, Jul. 26, 1995, abandoned.

[30] Foreign Application Priority Data

Aug. 15, 1994 [JP] Japan .................................. 6-213193

[51] Int. Cl.$^6$ ............................................ B01D 24/46
[52] U.S. Cl. ........................... 210/795; 210/617; 210/618; 210/797; 210/798; 210/807; 210/150; 210/151; 210/221.2; 210/274
[58] Field of Search .................................... 210/615–618, 210/741, 792–796, 807, 808, 107, 108, 150, 151, 269, 275, 276, 277, 280, 383, 393, 274, 797, 798, 221.2

[56] References Cited

U.S. PATENT DOCUMENTS

| | | | |
|---|---|---|---|
| 5,126,042 | 6/1992 | Malone | 210/150 |
| 5,145,589 | 9/1992 | Okubo et al. | 210/795 |
| 5,232,586 | 8/1993 | Malone | 210/151 |
| 5,445,740 | 8/1995 | Malone | 210/150 |

*Primary Examiner*—Robert Popovics
*Attorney, Agent, or Firm*—Marshall & Melhorn

[57] ABSTRACT

In a method for backwashing a water processing system using a buoyant filter layer constrained under wire mesh screen extending across a processing vessel, a water surface level in the processing vessel is lowered below the wire mesh screen. Air is subsequently released from under the buoyant filter layer to separate substances clogging the filter layer, while allowing the release of air out of said vessel from an upper part thereof. By lowering the water surface level below the upper wire mesh screen, the filter material is allowed to move more freely because the filter material is not restricted by the wire mesh screen from making upward movement. Hence, when air is released from under the filter layer, the filter material can move uniformly over the entire filter layer, and the clogging substances such as SS captured by the filter material and the biological film formed on the surface of the filter material can be favorably removed without damaging the filter material. The removed clogging substances may be allowed to precipitate in a lower part of the processing vessel so that they can be readily removed out of the processing vessel from an eject port provided in a lower part of the processing vessel, or may be drawn out of the processing vessel along with backwashing water into a precipitating vessel so that the clogging substances may be separated in the precipitating vessel.

13 Claims, 2 Drawing Sheets

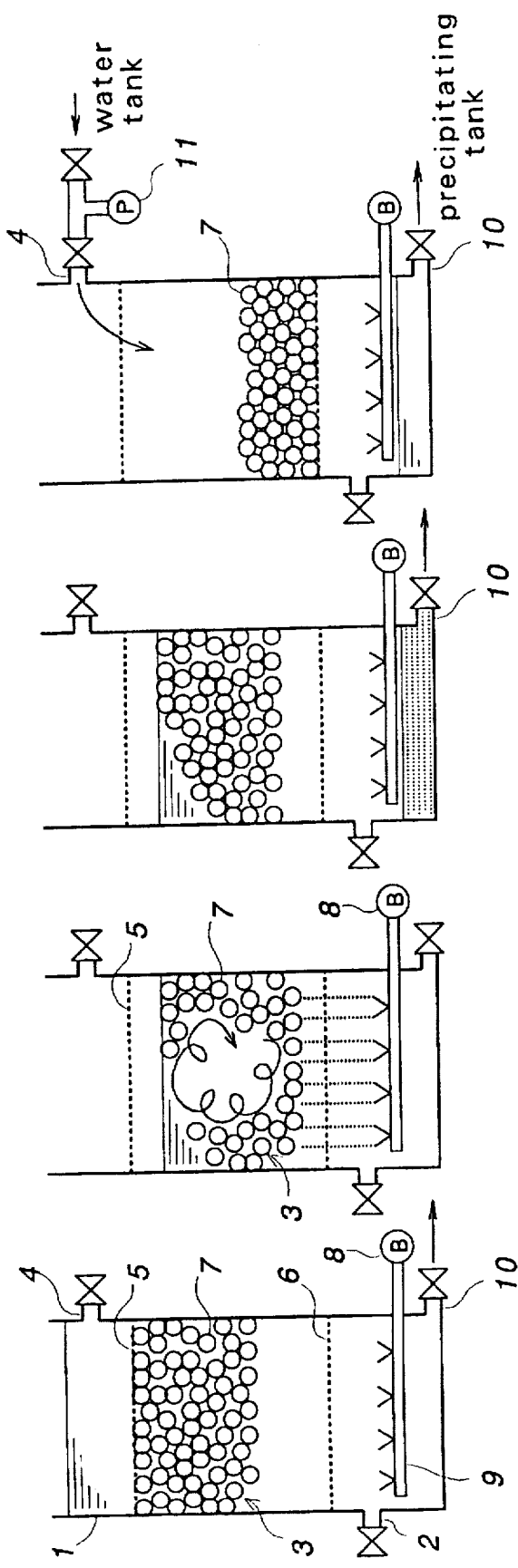

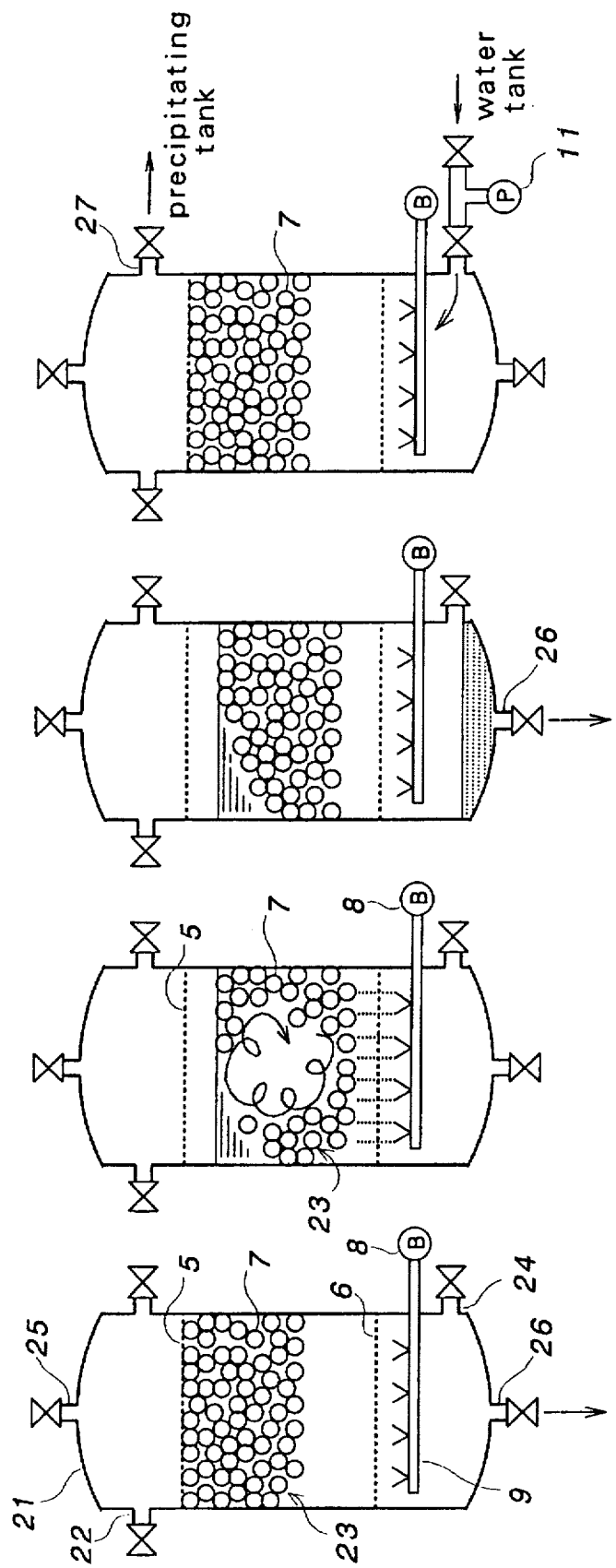

5,750,041

METHOD FOR BACKWASHING WATER PROCESSING SYSTEMS

CROSS REFERENCE TO RELATED APPLICATIONS

This application is a continuation-in-part of application Ser. No. 08/506,738 filed Jul. 26, 1995, now abandoned, which is incorporated herein by reference.

TECHNICAL FIELD

The present invention relates to a method for backwashing water processing systems which use buoyant filter material held under a wire mesh screen or other filter restraining means.

BACKGROUND OF THE INVENTION

Fine filtering processes and biological film processes which use buoyant filter materials such as foamed plastic materials are being widely used for processing water in various applications. In fine filtering processes, SS (suspended substances) consisting of fine particles are captured by a filter layer filled with buoyant filter material typically in the form of irregular shaped blocks and/or granules of foamed plastic material. In biological film processes, organic substances contained in the water are biologically decomposed by microorganisms deposited and grown on the surface of the filter material. An additional water processing method using a buoyant filter layer employs the known oil/water separating process which causes oil droplets that are suspended in the water to coalesce on the lipophilic surface of the filter material, and to separate into an oil layer which collects on the surface of the water.

In such water processing systems, as the process operation progresses, the SS and/or the fully grown biological film progressively block the gaps in the filter material, and ultimately lower the filtering efficiency to an unacceptably low level. The space ratio of the filter layer is typically selected at a high level such as 98% to prevent such a situation form arising in a short period of time, thus the filtering efficiency is relatively low under normal operating conditions. The filtering efficiency may be improved by reducing the space ratio to a lower level such as 50 to 80%, but it will create a need to carry out backwashing frequently relative to the filters with greater space ratios to prevent the clogging of the filter layer. Conventionally, air and/or water is released from under the filter layer so as to agitate or stir the filter material. The blocks of filter material are thereby forced to collide into one another, and the substances deposited on the filter material are separated therefrom. Thus, substances clogging the filter layer are shaken off from the surface of the filter material, and the separated substances are then washed away by water flow.

According to these conventional backwashing methods, which were originally developed for backwashing inorganic filter materials consisting of such materials as anthracite, the filter material that consists of light-weight plastic material is not uniformly backwashed, which results in the need to backwash the filter more often than initially anticipated. Furthermore, much water is necessary for the process of backwashing, and the amount of water for backwashing may be as much as 30% of the amount of water that is processed. This in effect substantially reduces the operating effiency of the water processing system.

Proposals have been made to provide in an intermediate section of the processing vessel a stirrer to agitate the filter material therewith, but this method has the disadvantage of damaging the filter material. In particular, when the depth of the filter layer reaches 2.5 to 3.5 m as is often the case in biological film processes, a satisfactory backwashing result cannot be achieved. Even when the depth of the filter layer is less than 1 m, if the water to be processed has a high viscosity, for instance, because of a high concentration of vegetable oil, it is difficult to evenly stir the entire filter layer, and the backwashing must be performed too frequently so that the processing efficiency drops to an unacceptable level. For this reason, backwashing with a stirrer has never achieved any commercial acceptance to the knowledge of the inventor.

BRIEF SUMMARY OF THE INVENTION

In view of such problems of the prior art, a primary object of the present invention is to provide a method for backwashing a water processing system using buoyant filter material which can evenly backwash the filter material without damaging the same.

A second object of the of the present invention is to provide a method for backwashing a water processing system which is simple but can backwash the filter material in a highly even manner.

A third object of the present invention is to provide a method for backwashing a water processing system which does not require a large amount of water and therefore, would not substantially reduce the processing efficiency of the system.

These and other objects of the present invention can be accomplished by providing a method for backwashing a water processing system using a buoyant filter layer which is constrained under constraining means extending across a processing vessel, comprising the steps of: lowering a water surface level in said processing vessel below said constraining means; and releasing air from under said buoyant filter layer to separate substances clogging said filter layer therefrom, while at the same time allowing for the release of air out of said vessel from an upper part thereof.

By lowering the water surface level below the constraining means, the filter material is allowed to move more freely because it is not restricted by the constraining means from making upward movement. Hence, when air is released from under the filter layer, the filter material can move uniformly over the entire filter layer, and the clogging substances, such as SS captured by the filter material and the biological film formed on the surface of the filter material can be favorably removed without damaging the filter material. Furthermore, by allowing the release of air out of the vessel from an upper part thereof, the amount of air that can be introduced beneath the filter layer is not limited by the volume of water which is drained from the vessel, and the present invention can therefore thoroughly backwash the filter layer. It should be noted that the present invention is equally applicable to the systems which use upward and downward flows.

The substances removed from the filer layer by air bubbles are preferably allowed to precipitate in a lower part of the processing vessel so that they can be readily removed out of the processing vessel from an eject port provided in a lower part of the processing vessel. Particularly in the case of biological film, they can be relatively easily precipitated without using any chemical coalescing agents. It is preferable to more thoroughly wash the filter material by introducing backwashing water from a water outlet of the processing vessel following the step of releasing air from under the filter layer. The backwashing water may be derived from the effluent from the water processing system stored in a separate storage tank.

The water used for washing the filter layer may be lead to a precipitating tank so that it may be separated into an upper clear part and a heavier lower part, and the upper clear part may be recycled back to the water processing system. Hence the consumption of water for backwashing purpose is in effect substantially reduced, and the overall filtering efficiency of the system can be improved.

BRIEF DESCRIPTION OF THE DRAWINGS

Now the present invention is described in the following with reference to the appended drawings, in which:

FIGS. 1a to 1d are diagrams showing a first embodiment of the method of the present invention in a time sequence; and FIGS. 2a to 2d are diagrams similar to FIGS. 1a to 1d showing a second embodiment of the method of the present invention.

DETAILED DESCRIPTION OF THE PREFERRED EMBODIMENTS

Embodiment 1

Referring to FIG. 1, the processing system of this system consists of a biological film processing system which uses buoyant filter material placed in an upward flow arrangement. The water to be processed is introduced into the processing vessel 1 from a water inlet 2 provided in a relatively lower part of the processing vessel 1, and is purified as it flows upward through a buoyant filter layer 3 placed in a middle part of the processing vessel 1. After passing through the filter layer 3, the water continues to flow upward inside the processing vessel 1, and is ejected from a water outlet 4 provided in an upper part of the processing vessel 1. In this embodiment of the invention as illustrated, the processing vessel 1 lacks a top wall, thereby continually allowing the release of air from the top of the vessel 1.

The buoyant filter layer 3 comprises buoyant filter material 7 retained between a pair of wire mesh screens 5 and 6 extending laterally across the processing vessel 1. The filter material 7 in this embodiment consists of irregular shaped blocks of foamed plastic material, and biological film which forms and grows on the surface of the filter material 7 during the operation of the water processing system. The SS captured by the filter material 7 and water soluble contaminants which come into contact with the filter material 7 are decomposed by the biological film.

An air pipe 9 having a plurality of air release nozzles is provided near the bottom end of the processing vessel 1. Pressurized air produced by an air blower 8 may be supplied to the air pipe 9 for both aeration and backwashing purposes. An eject port 10 is provided in a lowermost part of the processing vessel 1 for removing the sludge which is primarily produced by the backwashing process out of the processing vessel 1.

The mode of backwashing this processing system is described in the following with reference to FIGS. 1a to 1d. First of all, illustrated in FIG. 1a, water is drawn out of the processing vessel 1 from the eject port 10 until the water surface level within the vessel 1 falls below the upper wire mesh screen 5. As illustrated in FIG. 1b, the blower 8 is then activated, and air is released from the nozzles. As a result, the buoyant filter mater 7 is agitated, and the biological film formed on the surface of the filter material 7 is separated. At this point, approximately one third of the microorganisms remain on the buoyant filter material 7 while two thirds of the microorganisms are separated from the filter material 7. As noted above, the open top of the vessel 1 allows the release of air out of the vessel from an upper part thereof during the release of air from beneath the filter layer 3.

The sludge consisting primarily of the biological film and SS eventually precipitates on the bottom surface of the vessel as illustrated in FIG. 1c, and is then ejected from the eject port 10 along with the water present in the processing vessel 1. As illustrated in FIG. 1d, water which is typically derived from the effluent of the water processing system, and stored in a separate water tank (not shown in the drawing) is pumped into the water outlet 4 of the processing vessel 1 by using a backwashing pump 11 to more thoroughly wash off the sludge that remains on the buoyant filter material 7, and the resulting sludge is removed from the eject port 10.

To evaluate the result of this backwashing process, experimental tests were conducted by using a water processing system which employs a cylindrical processing vessel 2 m in diameter and 6 m in height, and a buoyant filter layer 3 having a depth (as measured from the upper end of the filter layer to the lower end thereof) of 3 m. The water surface level in the water processing vessel 1 was lowered to approximately 30 cm below the upper wire mesh screen 5, and the buoyant filter layer 3 was agitated or stirred by activating the blower 8 having the output flow rate of 3.2 $m^3$/min and an outlet pressure of 5,000 mm Aq, and releasing air from the nozzles for 5 minutes at the flow rate of 2 $m^3$/min. Then, after the system has been left alone for approximately two minutes, the sludge separated from the filter material and deposited on the bottom of the water processing vessel 1 is removed via the eject port 10. Thereafter, by using a backwashing pump 11 having the output of 65 $m^3$/hr and a lift of 10 m, backwashing water derived as effluent from this water processing system is introduced in to the water processing vessel 1 at the flow rate of 65 $m^3$/hr for 5 to 10 minutes to wash the buoyant filter material, and water is flown upward for five minutes before completing the backwashing process.

The water ejected from the water processing vessel 1 as a result of the backwashing process contained 1,800 mg/liter of SS. When the backwashing is carried out by using rotating blades placed in the filter layer 3, the SS content was 950 mg/liter. Thus, the present invention was approximately twice as effective as the method which uses the rotating blades. The water processing system immediately after the backwashing process was substantially as effective as the system during the normal operating condition in terms of the capability to remove BOD and COD, thus indicating a quick recovery of the system from the backwashing process.

The consumption of the backwashing water was approximately 5% of the amount of the water that was processed. However, most of the biological flocs contained in the water used for backwashing were readily precipitated by simply keeping the water still and allowing them to precipitate naturally without using any chemical coalescing agents, and 50% of the upper clear part of the water was returned to the body of the processed water. Therefore, the effective amount of the backwashing water was a mere 2.5% of the processed water.

Embodiment 2

FIG. 2 shows the process of backwashing according to a second embodiment of the present invention in a time sequence. This processing system is similar to that of the first embodiment, but the water to be processed in this case flows downward in the processing vessel 1 instead of flowing upward. The water to be processed is introduced into the processing vessel 1 from an inlet 22 provided in an upper part of the processing vessel 21, and is purified as it flows downward thought the buoyant filter layer 23. The water processed by the filter layer 23 is ejected from a water outlet 24 provided in a lower part of the processing vessel 21.

The filter layer 23 likewise consists of blocks of filter material 7 restrained between upper and lower wire mesh screens 5 and 6. Similarly, an air pipe 9, having a plurality of nozzles for releasing air, is provided in a lower part of the processing vessel 21, and an air blower 8 for supplying air to the air pipe 9 is connected thereto. The upper end of the processing vessel 21 is provided with an oil outlet 25 for removing substances lighter than water such as oil, and the lower end of the processing vessel 21 is provided with an eject port 26 for removing substances heavier than water such as sludge, for instance, resulting form the backwashing process.

The mode of backwashing this processing system is described in the following with reference to FIGS. 2a to 2d. First of all, as illustrated in FIG. 2a, water is drawn out of the processing vessel 21 from the eject port 26 until the water surface level within the vessel 21 falls below the upper wire mesh screen 5. As is illustraded in FIG. 2b, the blower 8 is then activated, and air is released from the nozzles. As a result, the buoyant filter layer 23 is agitated, and the biological film formed on the surface of the filer material 7 is separated. While the air is being released from under the filter layer 23, the release of air is provided for from the upper part of the processing vessel 21. Any suitable means may be provided to accomplish this. For example, the oil outlet 25 may be opened while air is being released from under the filter layer 23, to thereby allow the release of air from an upper part of the vessel 21. Alternatively, a separate vent valve (not shown) could be provided in an upper part of the vessel 21, the vent valve being capable of being opened to allow the release of air from the upper part of vessel 21. As will be appreciated the valve employed should have a sufficient passage area to allow the release of air from the vessel 21 without any significant resistance.

After a given time period has elapsed, the biological film and SS separated from the filer material 7 are deposited on the bottom of the processing vessel 21 as sludge. The sludge is then ejected from the eject port 26 along with the water which is derived from the effluent of the water processing system and stored in a separate water tank (not shown in the drawing) is pumped into the water outlet 24 of the processing vessel 21 by using a backwashing pump 11 to wash off the sludge that remains on the buoyant filter material 7, and the sludge is removed from the upper exit 27 along with the backwashing water.

The present invention was applied to bioloigical film processing systems using buoyant filter material in the above described embodiments, but is not limited by these particular emodiments, and can be applied to other applications such as fine filtering systems and oil/water separating systems using buoyant filter material.

Thus, according to the backwashing method of the present invention, the foreign substances trapped in the filter layer can be removed uniformly over the entire filter layer to an appropriate extent, and the water processign system can be quickly returned to its normal operating conditions following the backwashing process. For instance, one third of the microorganisms in the case of the biological film process, one third of the oil content in the case of the water/oil separating process, and one third of the SS in the case of the fine filtering system can be left in the filter layer, and the water processng system is therefore capable of quickly resuming normal operations with a high degree of operating efficency immediately after the process of backwashing.

In particular, in the case of the biological film process, the sludge or the flocs of microorganisms released by the backwashing process are relatively strongly coalesced, and can be therefore readily separated from the backwashing water by natural precipitation, for instance in about 30 minutes, without using any chemical coalescing agent. Thus, the upper clear part of the backwashing water can be returned to the processed water, and the water processing efficiency can be improved. For instance, it is possible to reduce the ratio of the backwashing water to the water to be processed from 30% to less than 3%.

Although the present inventin has been described in terms of specific embodiments thereof, it is possible to modify and alter details thereof without departing from the spirit of the present invention.

What we claim is:

1. A method for backwashing a water processing system using a buoyant filter layer which is constrained in a middle portion of a processing vessel by upper and lower constraining means extending across said processing vessel, comprising the steps of:

lowering a water surface level in said processing vessel to a level which is below said upper constraining means and above said lower constraining means; and maintaining said water surface level at a level which is below said upper constraining means and above said lower constraining means while releasing air from under said buoyant filter layer to separate substances clogging said filter layer therefrom, and while allowing the release of air out of said vessel from an upper part thereof.

2. A method according to claim 1, further comprising the steps of letting said clogging substances precipitate in a lower part of said processing vessel, and removing said precipitated substances out of said processing vessel from an eject port provided in a lower part of said processing vessel.

3. A method according to claim 2, wherein said processing vessel comprises a water inlet provided in a lower part of said vessel, and a water outlet provided in an upper part of said processing vessel.

4. A method according to claim 3, further comprising the step of introducing water into said processing vessel from said water outlet to wash said buoyant filter layer therewith, and removing the same from a lower part of said processing vessel.

5. A method according to claim 4, further comprising the step of introducing said water removed from said processing vessel into a precipitating vessel to separate the same into an upper clear part and a lower heavier part, and recycling said upper clear part back to said water processing system.

6. A method according to claim 2, wherein said processing vessel comprises a water inlet provided in an upper part of said vessel, and a water outlet provided in a lower part of said processing vessel.

7. A method according to claim 6, further comprising the step of introducing water into said processing vessel from said water outlet to wash said buoyant filter layer therewith, and removing the same from an upper part of said processing vessel.

8. A method according to claim 7, further comprising the step of introducing said water removed from said processing vessel into a precipitating vessel to separate the same into an upper clear part and a lower heavier part, and recycling said upper clear part back to said water processing system.

9. A method according to claim 1, wherein said processing vessel is cylindrical.

10. A method according to claim 1, wherein a top portion of said processing vessel is open to the atmosphere, allowing the continual release of air from an upper part of said vessel.

11. A method according to claim 1, further comprising the step of opening a valve provided in the upper part of said vessel to allow the release of air therefrom while air is released from under said buoyant filter layer.

12. A method for backwashing a water processing system including a cylindrical processing vessel, comprising the steps of:

providing a buoyant filter layer which is constrained in a middle portion of said processing vessel by upper and lower constraining means extending across said processing vessel;

lowering a water surface level in said processing vessel below said upper constraining means but above said lower constraining means; and releasing air from under said buoyant filter layer to separate substances clogging said filter layer therefrom while maintaining said water surface level at a level which is below said upper constraining means and above said lower constraining means.

13. A method according to claim 12, further comprising the step of allowing the release of air out of said vessel from an upper part thereof.

* * * * *